United States Patent [19]
Kakihara et al.

[11] Patent Number: 5,293,163
[45] Date of Patent: Mar. 8, 1994

[54] NAVIGATION APPARATUS FOR VEHICLES

[75] Inventors: Masaki Kakihara, Kronberg, Fed. Rep. of Germany; Masao Sasaki, Hiroshima, Japan; Yasuyuki Masaki, Sagamihara, Japan; Tatsuaki Taniguchi, Hiroshima, Japan; Toshihiko Okamoto, Hiroshima, Japan; Futoshi Shoji, Hiroshima, Japan; Keiji Takao, Higashihiroshima, Japan

[73] Assignee: Mazda Motor Corporation, Hiroshima, Japan

[21] Appl. No.: 108,834

[22] Filed: Aug. 18, 1993

Related U.S. Application Data

[63] Continuation of Ser. No. 711,614, Jun. 5, 1991, abandoned.

[30] Foreign Application Priority Data

Jun. 6, 1990 [JP] Japan .................................. 2-148136

[51] Int. Cl.$^5$ ............................................ G08G 1/123
[52] U.S. Cl. ................................... 340/995; 340/905; 340/988; 364/444; 364/449
[58] Field of Search ............... 340/995, 990, 988, 905, 340/932.2; 364/444, 449, 436, 437; 455/186, 228; 73/178 R

[56] References Cited

U.S. PATENT DOCUMENTS

| | | | |
|---|---|---|---|
| 4,301,506 | 11/1981 | Turco | 340/988 |
| 4,409,583 | 10/1983 | Dahan et al. | 340/995 |
| 5,031,104 | 7/1991 | Ikeda et al. | 340/990 |
| 5,041,983 | 8/1991 | Nakahara et al. | 364/449 |
| 5,091,727 | 2/1992 | Mahmood | 340/932.2 |
| 5,095,532 | 3/1992 | Mardus | 455/228 |
| 5,103,400 | 4/1992 | Yamada et al. | 340/995 |

FOREIGN PATENT DOCUMENTS 3613195 11/1986 Fed. Rep. of Germany .

*Primary Examiner*—Brent Swarthout
*Attorney, Agent, or Firm*—Price, Heneveld, Cooper, DeWitt & Litton

[57] ABSTRACT

A navigation apparatus for vehicles according to the present invention has a display device for displaying road information. The navigation system is designed to selectively display the road information which is close to the current position of the vehicle and/or the demands of the driver from a large amount of road information (each of which consists of image data to be displayed and logical data on which logical determination can be made).

15 Claims, 25 Drawing Sheets

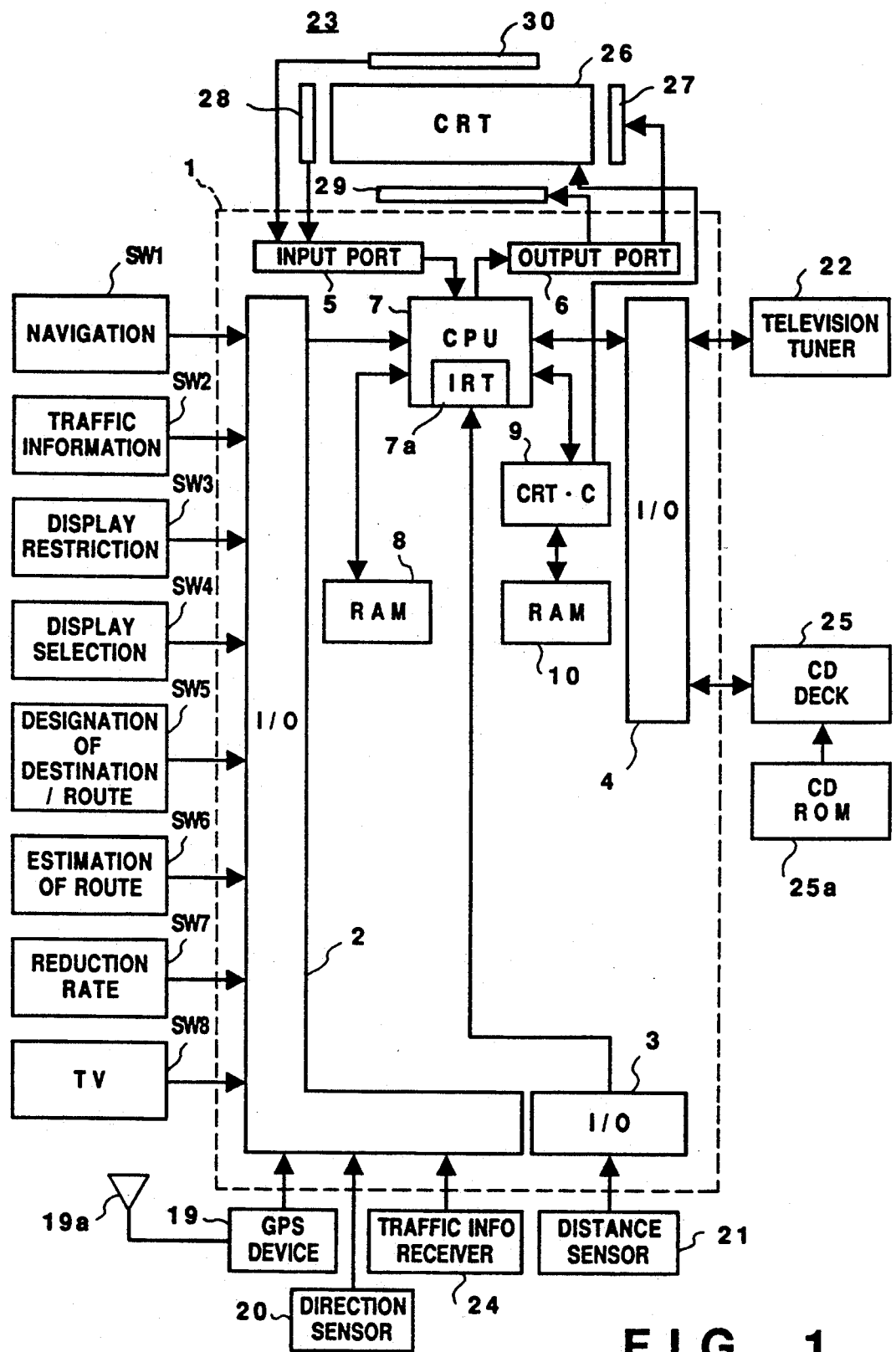
F I G. 1

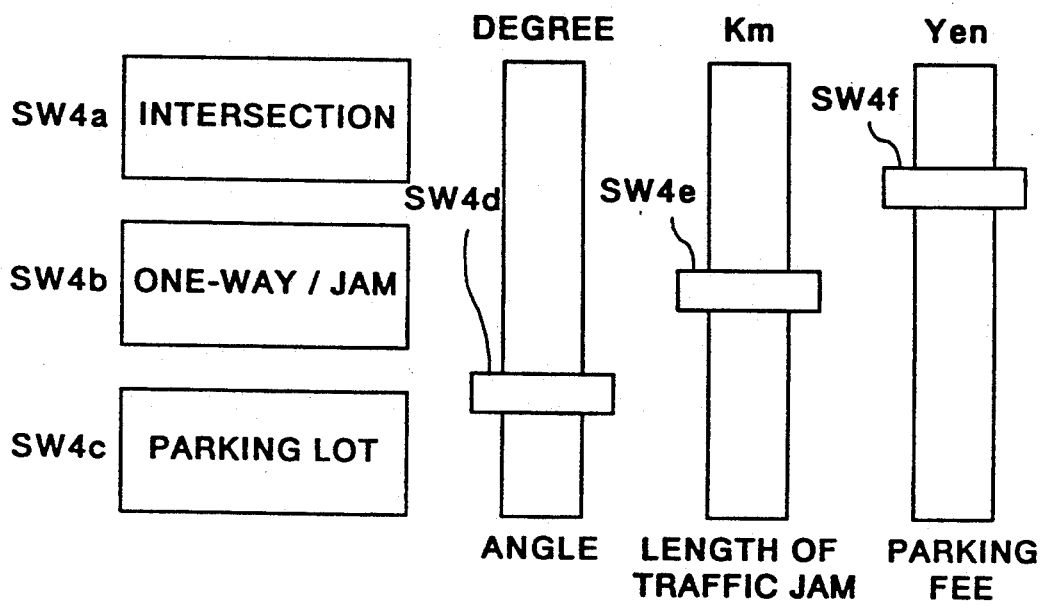
F I G. 3

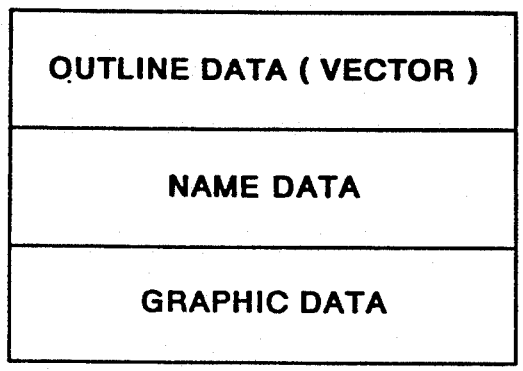
F I G. 4A
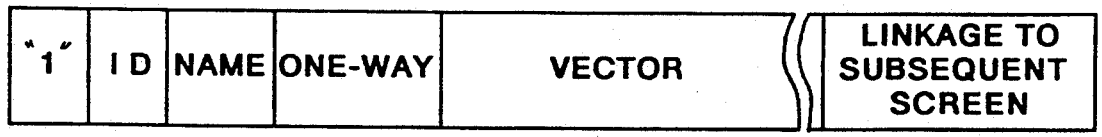
F I G. 4B

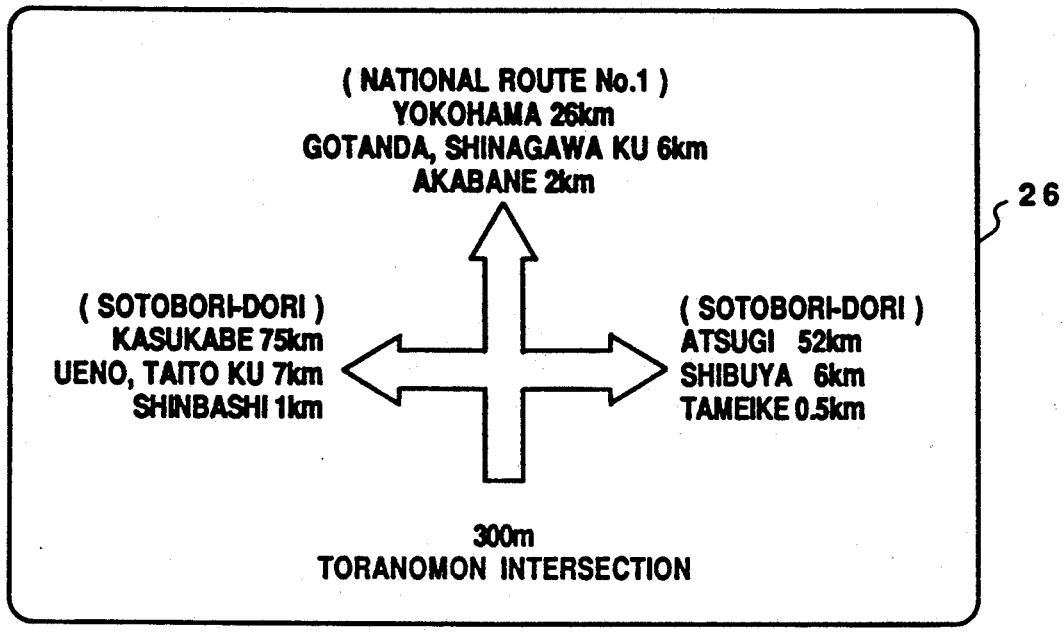
F I G. 5A
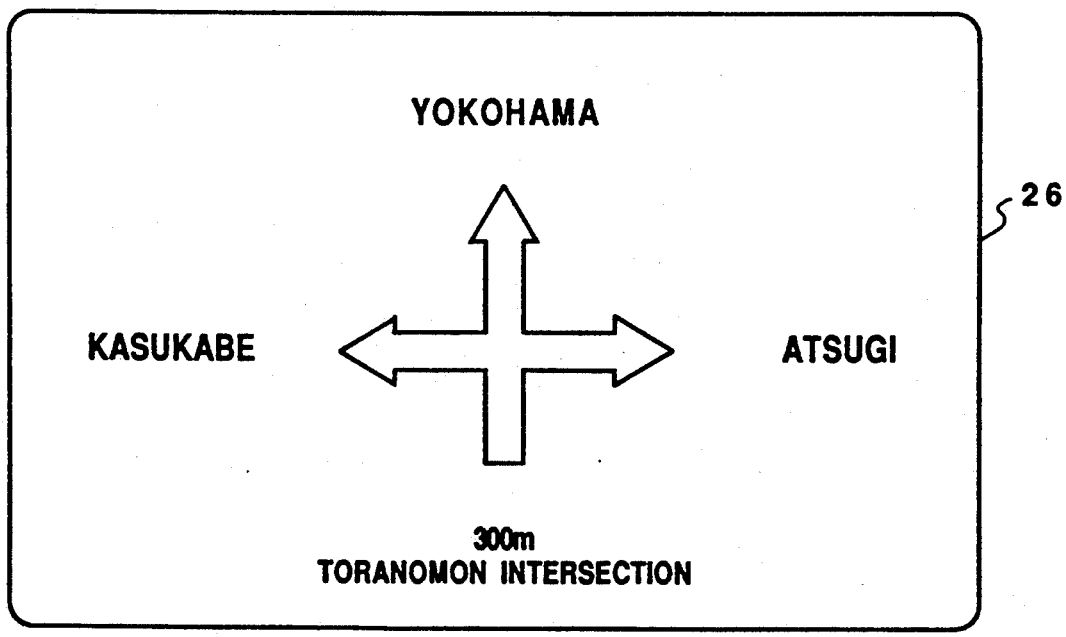
F I G. 5B

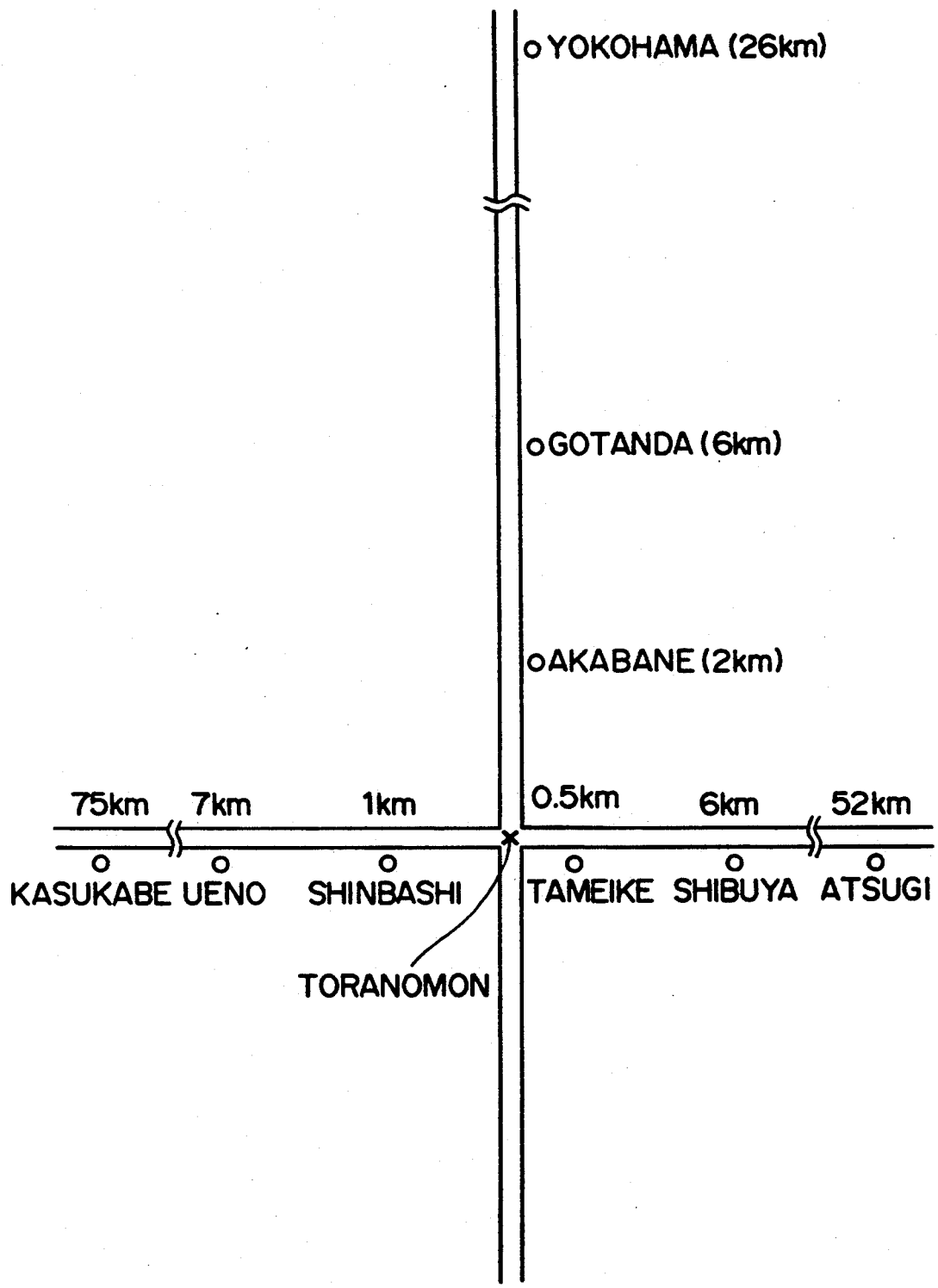
F I G. 6

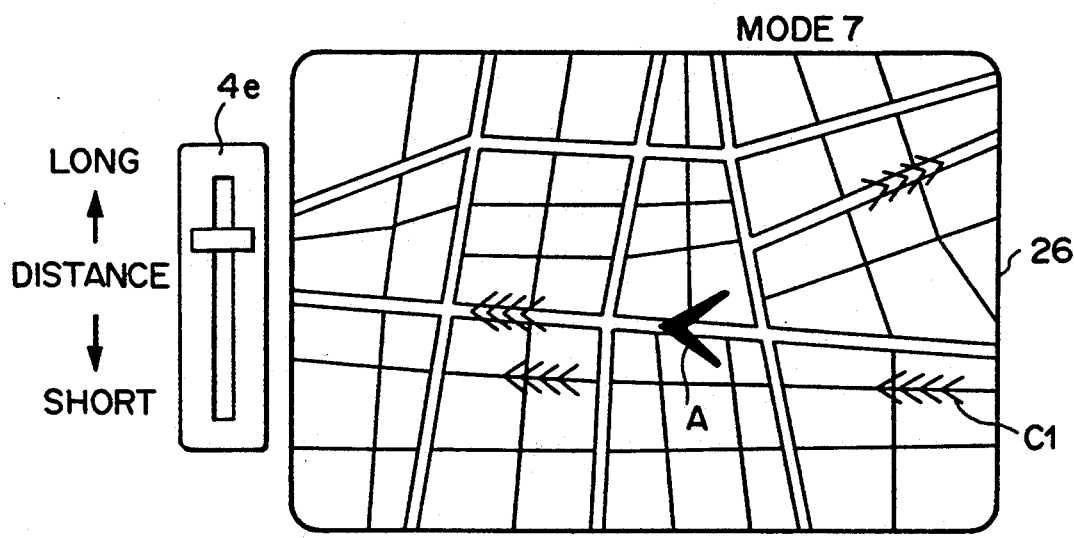
F I G. 11

FIG. 12A

| "2" | ID | NAME | LOCATION | DIRECTION | NAME | DISTANCE | DIRECTION | NAME | DISTANCE |

PLACE DATA (NAME | DISTANCE | DIRECTION)

FIG. 12B

| "3" | ID | NAME | LOCATION | FEE | ID | NAME | LOCATION | FEE |

INTERNAL PARKING LOT DATA

| "4" | LOCATION | LENGTH | SPEED | LOCATION | LENGTH | SPEED |
|---|---|---|---|---|---|---|
| | _____ TRAFFIC JAM DATA _____ | | | | | |

FIG. 12C

| "5" | ID | LOCATION | OCCUPATION RATE | ID | LOCATION | OCCUPATION RATE |
|---|---|---|---|---|---|---|
| | _____ EXTERNAL PARKING LOT DATA _____ | | | | | |

FIG. 12D

| "6" | DESTINATION | FLAG | ROUTE 1 | FLAG | ROUTE 2 | ... |

FIG. 12E

| "7" | INTERSECTION 1 | INTERSECTION 2 | ... |

FIG. 12F

|  | MODE1 | MODE2 | MODE3 | MODE4 | MODE5 | MODE6 | MODE7 |
|---|---|---|---|---|---|---|---|
| SW1 | ○ | ○ | ○ | ○ | ○ | ○ | ○ |
| SW2 | × | / | / | / | / | / | ○ |
| SW3 | ○ | ○ | ○ | ○ | ○ | ○ | ○ |
| SW4a | ○ | / | / | ○ | / | / | × |
| SW4b | × | / | / | / | / | / | ○ |
| SW4c | × | / | / | / | / | / | × |
| SW4d | × | × | × | × | ○ | ○ | × |
| SW4e | × | × | × | × | × | × | ○ |
| SW4f | × | × | ○ | × | × | ○ | × |
| SW5 | ○ | ○ | ○ | × | × | × | × |
| SW6 | × | ○ | × | × | × | × | × |

FIG. 13

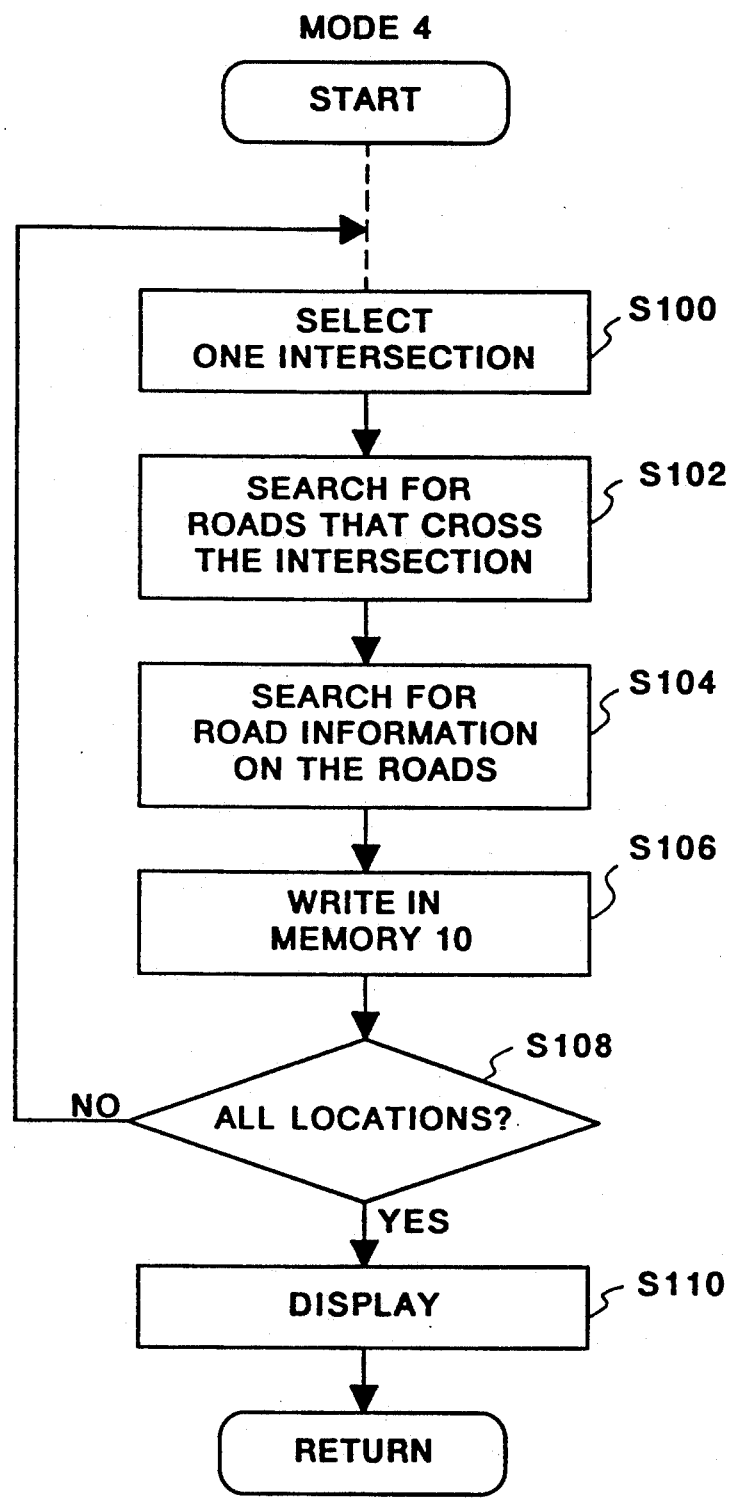
F I G. 18

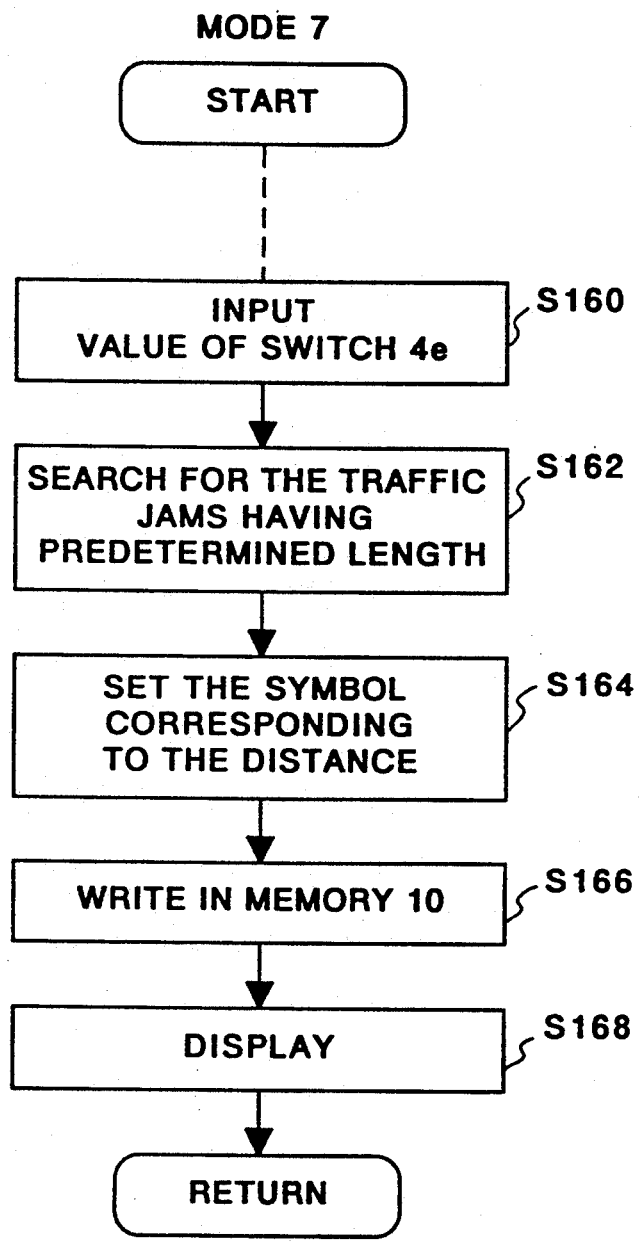
F I G. 21

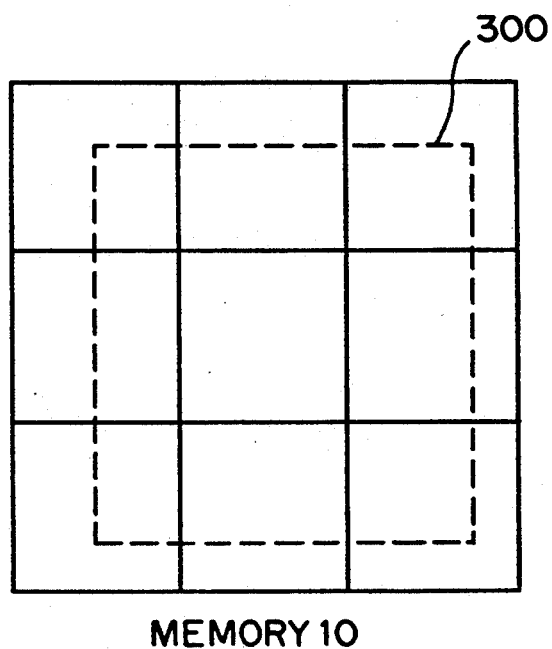
MEMORY 10
F I G. 22

NAVIGATION APPARATUS FOR VEHICLES

This is a continuation of application Ser. No. 07/711,614 filed on Jun. 5, 1991, now abandoned.

BACKGROUND OF THE INVENTION

The present invention relates to the improvement of a navigation apparatus for vehicles, which has the function of displaying the current position, travelling direction, etc of the vehicle with a map image overlapped on the screen of such a display device as CRT display.

Such navigation apparatuses are generally designed to display on a CRT screen map information stored in a large-capacity storage device, such as a CD-ROM. Examples of the types of the map information include the courses, names, lengths, and directions of roads, the names of the places along a road, the locations and names of intersections, and the locations or names of buildings. These map information are incorporated in the vehicle and hence can be called "internal road information".

Navigation systems having means for receiving traffic information through the radio are also known. In this navigation system, all the traffic information that can be displayed presently is displayed on a CRT screen in accordance with the data received by the reception means (this data being hereinafter referred to as "external road information") and the internal road information. Such a navigation system is disclosed in, for example, Japanese Kokai No. 63-231477.

When all the internal road information, or all the internal and external road information, related to the travel of the vehicle is displayed on the screen of a display portion, as in the case of the aforementioned conventional examples, the amount of information displayed on the screen becomes too much and the visibility of the necessary information is deteriorated, although abundant information can be offered to the driver. For example, the traffic information about the roads in the opposite direction to that in which the vehicle is currently travelling is basically unnecessary for the driver.

SUMMARY OF THE INVENTION

Accordingly, an object of the present invention is to provide a navigation system which allows the road information required for driving to be displayed on the screen and hence notified adequately to the driver without reducing the visibility of the information displayed on the screen of a displaying device.

To achieve this object, the present invention provides a navigation system having display means for displaying road information, which comprises:

current position estimation means for estimating the current position of the vehicle;

storage means for storing a large amount of road information which consists of image data to be displayed and logical data on which logical determination can be made by determination means;

reading means for searching for the road information related to the estimated current position of the vehicle and for reading out that information from the storage means;

determination means for determining relation degree of the read out road information to the travel of the vehicle on the basis of the individual logical data contained in the read out road information; and display restriction means for restricting display of the road information which is determined less related to the travel of the vehicle by the determination means.

In the aforementioned navigation system, the logical data may be the identification of a road or a building, the location of a road, the connection of roads, the direction of a road, the data as to whether the road is a one-way road or not, or the location of a parking lot, for example.

Another object of the present invention is to provide a navigation system which has the function of inputting auxiliary information from the driver or an external source in order to achieve more accurate determination as to how closely the road information is related to the travel of the vehicle.

In one preferred aspect of the present invention, the auxiliary information comprises a destination designated by the driver.

In another preferred aspect of the present invention, the auxiliary information comprises a range of the direction in which the vehicle may travel.

In another preferred aspect of the present invention, the auxiliary information comprises current traffic information on roads located near the current position.

In another preferred aspect of the present invention, the auxiliary information comprises externally obtained current traffic information on the road near the current position and selection criterion information for selection of the traffic information.

In another preferred aspect of the present invention, the traffic information comprises data as to how much the roads on which the vehicle may travel is jammed with cars.

In another preferred aspect of the present invention, the traffic information comprises the occupation rates of the parking lots.

Other objects and advantages besides those discussed above shall be apparent to those skilled in the art form the description of a preferred embodiment of the invention which follows. In the description, reference is made to accompanying drawings, which form a part hereof, and which illustrate an example of the invention. Such example, however, is not exhaustive of the various embodiments of the invention, and therefore reference is made to the claims which follow the description for determining the scope of the invention.

DESCRIPTION OF THE DRAWINGS

FIG. 1 is a block diagram of an embodiment of a navigation system according to the present invention;

FIG. 3 shows the switches incorporated in the navigation system of FIG. 1 to input various types of auxiliary data;

FIG. 4A explains the structure of information stored in a CDROM;

FIG. 4B shows a format of map data stored in the CDROM;

FIGS. 5A and 5B explain the display conducted in the mode 1 which is one of the control methods in the embodiment according to the present invention;

FIG. 6 explains the relative positions of the places displayed in FIGS. 5A and 5B;

FIG. 11 explains the display conducted when there is display control of the mode 7;

FIGS. 12A to 12F explain the formats of various types of internal and external information used in the controls of the mode 1 to mode 7;

FIG. 13 shows the table used to determine the mode;

FIG. 18 is a flowchart of the control procedures for the mode 4;

FIG. 21 is a flowchart of the control procedures for the mode 7; and

FIG. 22 explains the arrangement of the storage areas in an image memory 10 for storing image data in the navigation system.

DETAILED DESCRIPTION OF THE PREFERRED EMBODIMENTS

Figure 2:
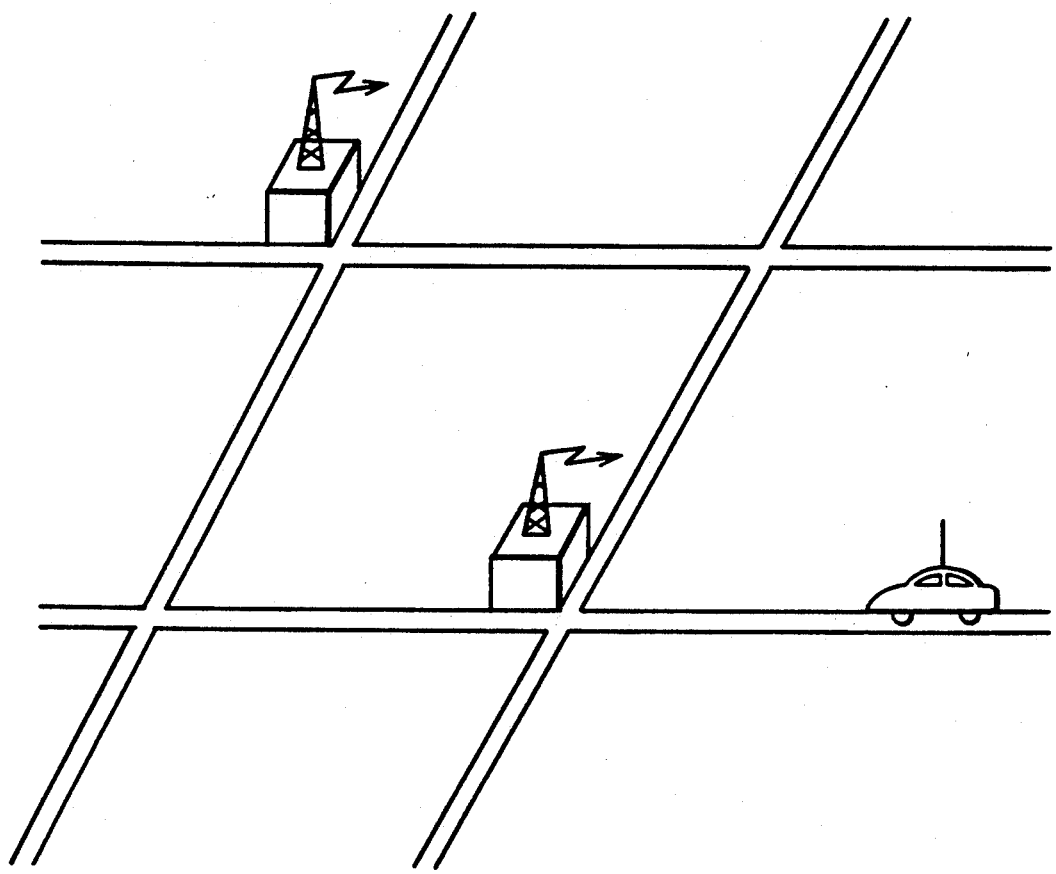
FIG. 2 shows the relation between each of stations from which map information (traffic information) is sent out and the vehicle

An embodiment of the present invention will be described below with reference to the accompanying drawings.

FIG. 1 is a block diagram of the embodiment of a navigation system according to the present invention. In this navigation system, among a large amount of information to be displayed, the data required for navigation is selectively displayed on a CRT 26. Therefore, determination of the viewpoint from which the information to be displayed is selected is essential.

In this embodiment, examples of information displayed on the CRT include the courses, names, and directions of a road, the names of the places along roads; the locations and names of intersections; the locations and names of buildings; the locations of parking lots; the data as to whether the roads are one-way roads or not; and the traffic jam information. These information are related to the travel of a vehicle on a road and are thus called broadly "road information". "Road information" is classified into "internal map information" stored in a vehicle, and "external map information" input from an external source. The internal map information is the road information stored in a storage medium (which may be a CD-ROM 25a) mounted on the vehicle. As the ROM 25a is read-out only, this type of road information is not changed. The external map information is input from a traffic information receiver 24. The external map information may be the traffic jam data of a road or the occupation rate of a parking lot. The external map information is changing every moment and hence must depend upon an external information source.

SYSTEM CONFIGURATION

The configuration of the navigation system shown in FIG. 1 will be described. This system includes a controller 1, a CRT 26 for displaying images for navigation or TV broadcast, a touch panel 23 which allows the CRT 26 to be used as a user interface and which consists of light-emitting diodes 27 and 29 and light-receiving elements 28 and 30, a television tuner 22, a CD deck 25 which is a CD player, a ROM 25a which is the recording medium, a group of various types of operation switches SW, a global positioning system (GPS) 19 which is the means for estimating the position of the vehicle, a direction sensor 20 for measuring the direction of travel of the vehicle, a distance sensor 21 for detecting the travelling distance, and the aforementioned traffic information receiver 24 for inputting the "external map information".

The light-emitting diodes 27 and 29 and the light-receiving elements 28 and 30 in combination form the touch panel 23 on the screen of the CRT 26. The touch panel 23 is used when the driver designates a destination while viewing the display screen or inputs a desired travelling route.

The group of switches SW1 to SW8 which is connected to CPU 7 through I/O 2 will be described in detail. Whether the CRT 26 is used as the television display device or as the navigation display device is determined by the driver's pressing the switch SW8 or SW1.

Whether or not the traffic information input by the receiver 24 from an external source is input to the system itself is determined by the driver's pressing or nonpressing the switch SW2. The traffic information can be obtained by receiving radio waves sent from a plurality of stations, as shown in FIG. 2.

The position of the vehicle can be estimated by integrating the travelling distance detected by the distance sensor 21 at predetermined time intervals with the travelling direction detected by the senor 20 which detects the terrestrial magnetism taken into consideration. The detection is made via I/O 3 through an interrupt handling mechanism IRT 7a. Since the detection of the terrestrial magnetism generates errors, the thus-obtained position of the vehicle is adequately corrected using the position of the vehicle detected by the GPS device 19.

When the driver presses the switch SW3, the controller 1 automatically performs selection of the information to be displayed.

When the driver presses the switch SW5, input from the touch panel 23 is made possible. That is, when one place is input from the touch panel 23 while the switch SW5 is being pressed, the system recognizes that the input place is the driver's destination. When a plurality of places are input, the system recognizes that the driver desires to pass along the road(s) which runs along these places to get to the destination. When the route estimating switch SW6 is pressed in a state in which one destination is input from the touch panel 23, one of the shortest route to the destination is selected as the candidate and displayed on the CRT 26 in a color different from that in which other roads are displayed.

The display selection switch SW4 will be described with reference to FIG. 3. The switch SW4 (FIG. 3) consists of normal switches SW4a to SW4c and three slide switches SW4d to SW4f. When the intersection switch 4a is pressed, the location of an intersection can be input from the touch panel 23. When the switch SW4b is pressed, display of the road together with the data representing whether or not the road is a one-way road or together with the data representing whether or not the road is congested with cars is instructed to the system. When the parking-lot-information switch 4c is pressed, the parking lot is displayed conspicuously. The three slide switches SW4d to SW4f will be detailed later.

The reduction rate switch SW7 is used for selection of the reduction scale of the map. When it is desired that the map be displayed in detail, a small reduction scale is designated.

FIG. 4A shows how the CD-ROM 25a is divided into storage areas. In the CD-ROM 25a, the map information (internal map information) to be displayed on one screen on the minimum reduction scale is stored in blocks. The map information consists of "outline data", "name-data" and "graphic data".

"Outline data" comprises the vector data representative of the outline of a road, river or building site. Single road is made up of a plurality of linked vectors. As the roads, rivers or buildings are real and visible and hence fundamental for navigation, display of the outline data is not restricted, i.e., they are always displayed, in this embodiment.

"Name-data" comprises the character data representing the name of a road, building or intersection. The individual name-data further contains the position where that name is to be displayed. Unlike the roads, rivers and buildings, "name" itself is not visible to the driver who looks out from the window of the vehicle, and is hence an object of the restriction of display in this embodiment.

"Graphic data" comprises the figure which symbolizes a road, river or building. A one-way road may be symbolized by the figure indicated by "D" in FIG. 7A. A traffic jam may be symbolized by "C" in FIG. 7A. The current position of the vehicle may be symbolized by "A" in FIG. 7A. Since "symbol" itself is not visible, the display of it can be restricted in this embodiment.

FIG. 4B shows how a road is expressed using the aforementioned "outline data", "name-data" and "graphic data". In FIG. 4B, the first field is used for the type of data. In this case, "1" indicating that the data is the road data is stored. A subsequent field is used for the identification No. ID for identifying that road. The field following the ID field is used for a pointer indicating the position where "name-data" (FIG. 4A) representing the name of that road is stored. The following field is used for the type of road (whether or not the road is a one-way road). A subsequent field is used for storing a pointer which specifies the symbol representative of that road (when necessary). The last field is used for storing the linkage of the outline data for a subsequent screen which follows the outline data displayed on this screen.

In addition to the information shown in FIG. 4, the map information stored in the CD-ROM 25a contains the information shown in FIGS. 12A and 12B.

This embodiment is constructed so that necessary information is selectively displayed from a large amount of displayable information, and the standard for selection can be set or changed by the driver himself. The information on the standard for selection is used to assist the system to make the selection and is therefore called "auxiliary information". As stated above, the information which is the object for selection is "name-data" and "graphic data". The standard for selection conducted in this system is classified as follows:

a: When the destination has been designated and the switch SW3 has been activated:

a-1:

When the display is not to be restricted (when the switch SW3 has not been pressed), all the information stored is displayed, as shown in FIG. 5A, when the vehicle reaches close to (about 300 m prior to) each intersection located en route to the destination. On the other hand, when the switch SW3 has been activated, the restricted information, namely only necessary information is displayed, as shown in FIG. 5B.

For more detail, FIG. 5A shows a case in which all the passing points stored in the CD-ROM 25a, located along "National Route 1" and "Sotobori dori" ("Sotobori" Street) starting from the "Toranomon" intersection, are displayed when the vehicle reaches 300 m before the "Toranomon" intersection where "National Route 1" crosses "Sotobori dori". FIG. 6 shows the relative positions of these places. According to FIG. 6, "Tameike" (0.5 km), "Shinbashi" (1 km) and "Akabane" (2 km) are considered to be at short distances from "Toranomon". "Ueno" (7 km), "Shibuya" (6 km) and "Gotanda" (6 km) are at intermediated distances, and "Atsugi" (52 km), "Kasukabe" (75 km) and "Yokohama" (26 km) are at long distances.

Speaking from the viewpoint of navigation, when the destination is far from the current position, i.e., when the vehicle must travel a long distance before it gets to the destination, display of the places located at short distances (and also at intermediate distances) is unnecessary to the driver, because the driver, who is going to travel to a far destination, often does not know or is not interested in the places located at short or intermediate distances. Furthermore, non-display of the unnecessary places improves visibility.

Figure 7A:
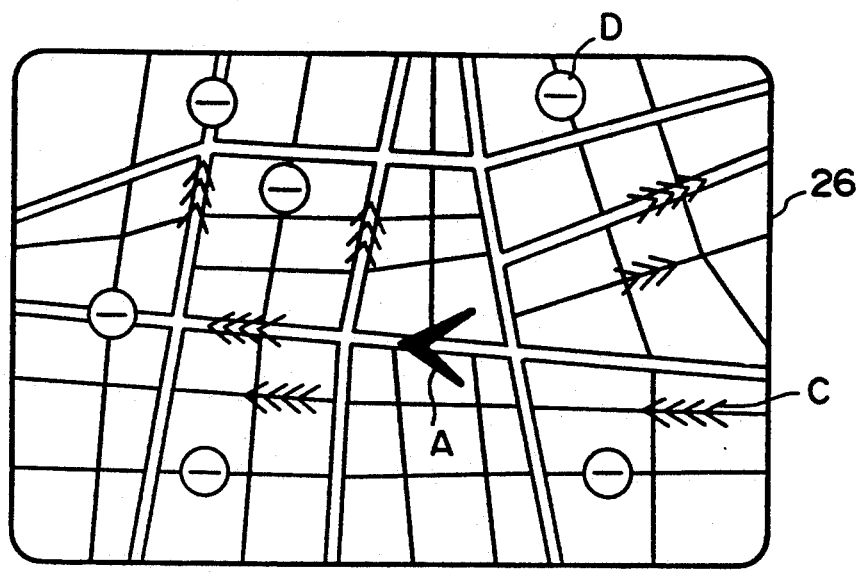
FIG. 7A explains the display conducted when there is no display control of the mode 2.
Figure 7B:
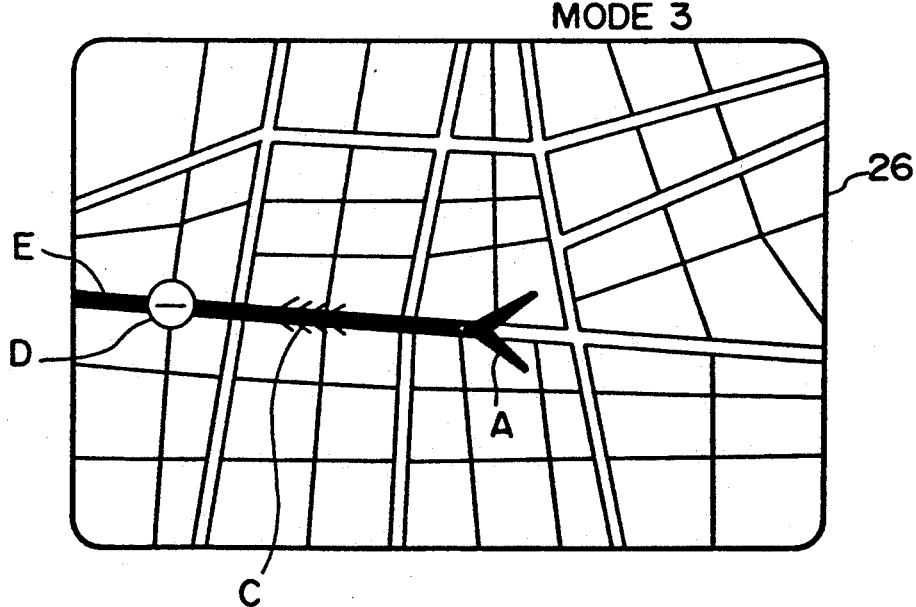
FIG. 7B explains the display conducted when there is display control of the mode 3.

On the contrary, when the destination is close to the current position, display of distant places is meaningless. Thus, when the destination is far from the current position, only the data on the distant places is displayed; when the destination is at an intermediate distance, only the data on the places which are at an intermediate distance is displayed; and when the destination is close to the current position, only the short distance data is displayed to improve the visibility.

a-2: When the driver has designated the course to his or her destination (when the course has been designated from the touch panel 23 after the switch SW5 was activated):

In this case, only the roads located along the course are the object of interest to the driver. Therefore, visibility is improved by displaying only that road information related to the actual position of the vehicle and the road along which the vehicle is travelling, as shown in FIG. 7B. FIG. 7A shows the display screen with no restrictions on the display. In FIGS. 7A and 7B, an arrow indicated by "A" represents the current position of the vehicle. "E" represents the road designated through the touch panel 23 when the switch SW5 is activated. Roads identified by "D" are one-way roads. Roads identified with "C" consisting of a with cars. The number of arrows indicates the length of the traffic jam.

The traffic jam information is one type of "external map information", as stated above.

Figure 7C:
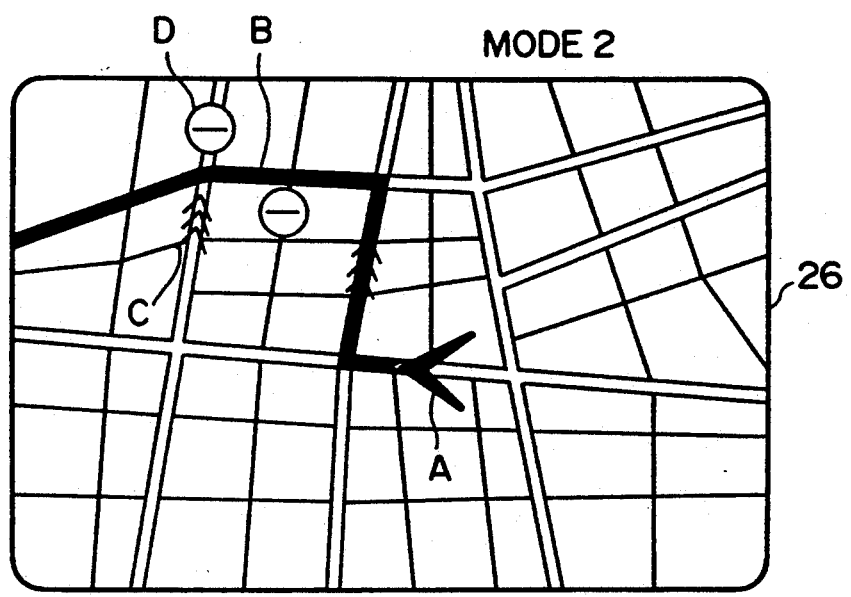
FIG. 7C explains the display conducted when there is display control of the mode 2.
Figure 8:
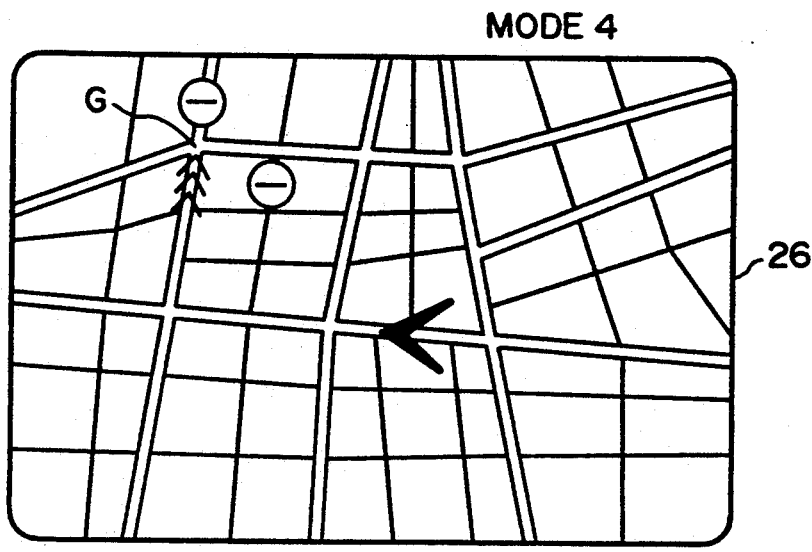
FIG. 8 explains the display conducted when there is display control of the mode 4.

As can be seen from FIGS. 7A and 7B, only that road information related to the road designated by the driver is displayed, in other words, there is no display of the information about the roads on which the vehicle will not travel. Consequently, the visibility of the road information on the designated road is improved.

a-3: When the selection of the route to the destination is left to the system (when the switch SW6 has been activated):

In this case, unlike that of a-2, as the driver may travel along a road other than that selected by the system, not only the information on the road en route but also the information on the roads located in the vicinity of that road must be displayed. FIG. 7C shows a case where the information on the roads located near the road selected by the system is displayed.

a-4: When a plurality of intersections have been designated as the destination (by pressing the switch SW4):

In FIG. 8, an intersection G is designated through the touch panel 23 in a state where the switch SW4 is pressed. In this case, only the information on the roads near the intersection G is displayed because the system determines that the information on the roads which are not located near the location designated by the driver is not important.

b: When the destination has not been designated:

b-1-1: When the direction toward the destination has been inferred (proposed) by the system.

Figure 9:
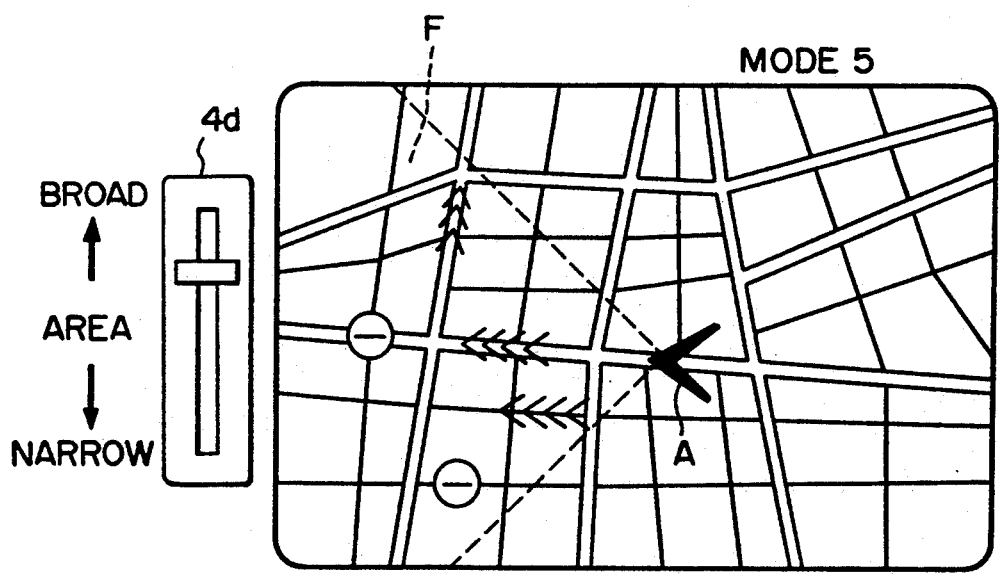
FIG. 9 explains the display conducted when there is display control of the mode 5.

Even if the destination is not designated by the driver, the system can calculate the direction toward the destination from the direction in which the vehicle is travelling. However, the present direction of travel may differ from that toward the destination. Hence, a fan-shaped area F which fans out in the directions of the travel by a predetermined angle (which is variable) is set using the slide switch 4d, as shown in FIG. 9, and display of the road information on the roads located within this area is given preference. This is because the possibility that the vehicle will travel along the roads located within the area F is high and display of those roads is thus important.

b-1-2: When the destination has been inferred (proposed).

Even if the destination is not designated by the driver, the system may be able to calculate the destination. For example, when the switch 4c is pressed, the system can determine that the driver may be heading for a nearby parking lot. In other words, the destination is either of the parking lots having a parking space in the neighborhood. In other words, the necessity that the road information on the parking lots which are full is low. Furthermore, as a plurality of parking lots may exit, the driver teaches the standard for selection to the system. In this embodiment, the standard for selection is the parking fee designated by the slide switch 4f. If the driver desires a parking lot whose parking fee is relatively high, he or she sets the slide switch 4f in the manner shown in FIG. 10A, and a lot of parking lots having a parking space may be displayed. If the driver desires a parking lot whose parking fee is relatively cheap, he or she sets the slide switch 4f in the manner shown in FIG. 10B. In this way, the number of parking lots to be displayed is reduced, and only parking lots which are desired by the driver are selectively displayed, as shown in FIG. 10B.

The information on the parking fee of each parking lot may be stored in the CD-ROM25a or it may be received through the receiver 24 from a nearby station as the traffic information.

c: Where the external map information is mainly displayed:

c-1:

Occurrence and/or length of a traffic jam, shown in FIG. 7A, and as to whether or not a parking lot has a parking space, shown in FIG. 10, are examples of the external information. The system inputs the external map information through the receiver 24 and determines the importance thereof utilizing the direction of travel, route or parking fee as "auxiliary data". The system does not display the road information which is determined as less important.

c-2: FIG. 11 shows another example of utilization of the external map information.

In this example, the system inputs the length of the traffic jam and the speed of the vehicles in the traffic jam as external map information. The system displays only the locations of the traffic jam whose length meets the requirement designated by the slide switch 4e as "auxiliary information". In this case, only the traffic jams whose lengths are longer or shorter than that designated by the switch 4e are displayed.

CONTROL FOR RESTRICTING INFORMATION TO BE DISPLAYED

FIG. 4B shows how the information on the single road is stored in the ROM 25a. FIGS. 12A and 12B show the formats of various types of "internal map information" other than the road information, stored in the CD-ROM 25a. FIGS. 12C and 12D show the formats of various types of "external map information" obtained through the traffic information receiver 24 from the external source.

FIG. 12A shows the information on intersections. This information contains the information on the places located along each of roads extending from a certain intersection, as shown in FIGS. 5A and 5B. That is, the intersection information is made up of the fields which respectively store the type code (=2) which indicates that this information is intersection information, the identification No. ID for specifying the intersection, the name of the intersection, the location of the intersection and a plurality of "data representing the places along the road". Each "data representing the place along the road" consists of "direction (right, left, or straight ahead)) data on the place, the name-data ("Yokohama" or "Atsugi", for example) on the road end, and the distance data from the intersection to that place.

FIG. 12B shows a format of the information on parking lots. The parking lot information is made up of the type code (=3) which indicates that this information is parking lot information, and a plurality of parking-lot data. Each parking-lot data contains the identification No. ID for specifying the parking lot, the name of the parking lot, the location of the parking lot and the parking fee of the parking lot.

The system periodically receives the various types of "external map information" and stores them in a RAM 8 in a predetermined format. FIGS. 12C and 12D show such "external map information".

FIG. 12C shows the format of "traffic jam information". The traffic jam information contains the type code (=4) which indicates that this information is a traffic jam information, and a plurality of traffic jam data. The individual traffic jam data contains the location of the jam (namely, ID of the road on which the jam occurs), the length of the jam and the speed of vehicles in that jam.

FIG. 12D shows the format of "parking lot utilization information" which is the external map information. The parking lot utilization information is made up of the type code (=5) which indicates that this information is a parking lot utilization information, and a plurality of utilization data. The individual utilization data contains ID of the parking lot, the location of the parking lot and the occupation rate of the parking lot.

FIGS. 12E and 12F show various types of information designated by the driver. The "destination" data shown in FIG. 12E is made up of the destination of the driver and the locations along the route which leads to the destination. The destination and locations along the route are input from the touch panel 23 when the switch SW5 is pressed, as stated above. In a case where the driver inputs the destination and locations along the route, the last location which the driver inputs is regarded as the destination of the driver. If the switch SW6 is pressed after the destination has been input from the touch panel, the route data indicates the shortest route to the designation that the system determines. In FIG. 12E, a flag indicates whether the route data is estimated (proposed) by the system or designated by the driver. The information shown in FIG. 12E is utilized for display control related to FIG. 7C.

FIG. 12F shows "intersection" data designated by the driver and utilized for display control shown in FIG. 8.

FIG. 13 shows various types of operation modes for display control which are selected on the basis of the operation patterns of various switches shown in FIGS. 1 and 3. In this system, there are seven types of modes (modes 1-7) in relation to the display control shown in FIGS. 5 to 11.

Figure 14:
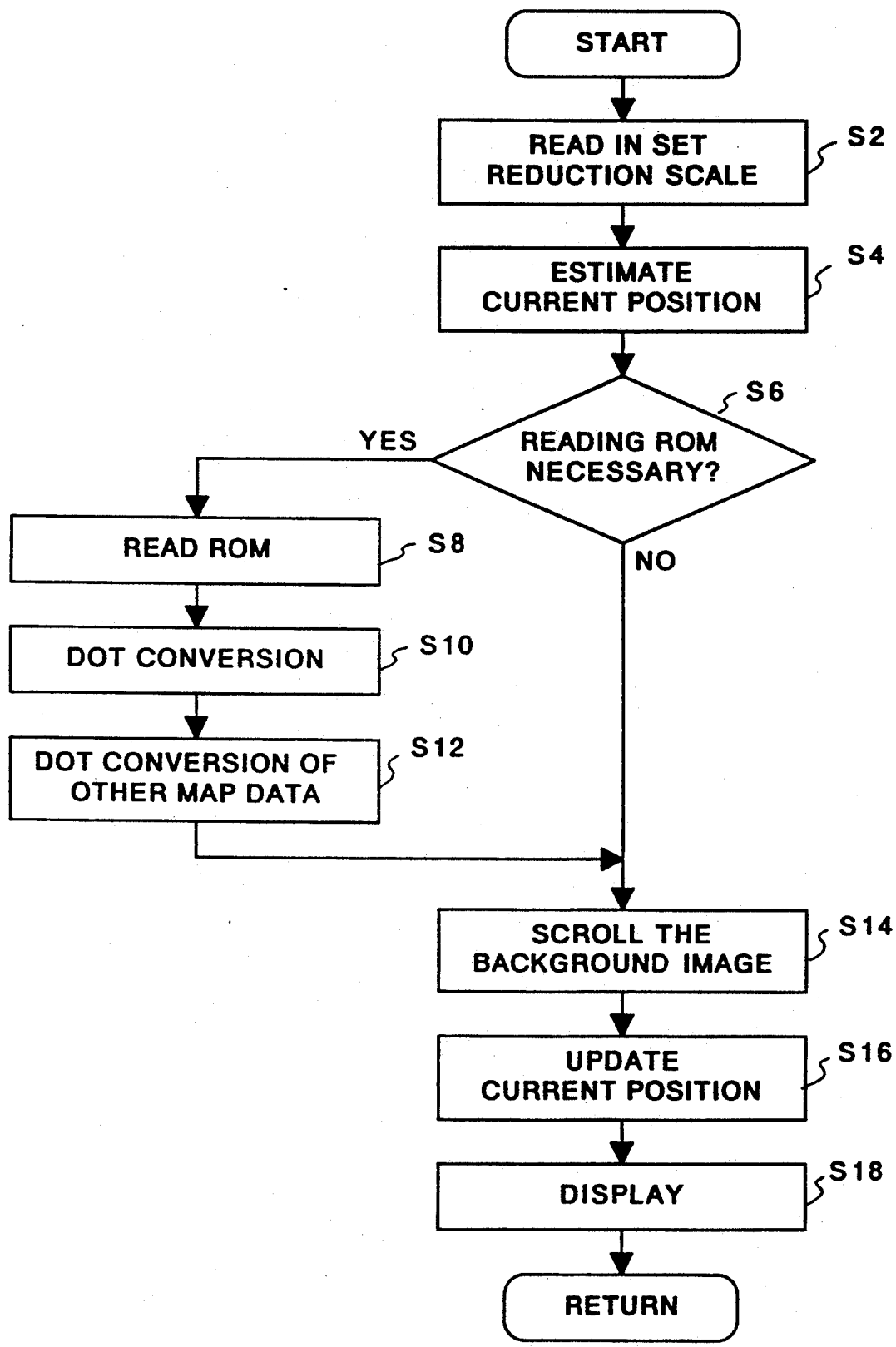
FIG. 14 is a flowchart of the control procedures for the display conducted by the navigation system when one of mode 1 to mode 7 not designated.

FIG. 14 shows the control procedures for the display control (normal display control) required when none of the seven modes is selected. In this normal display mode, the map information stored in the CD-ROM 25a and those obtained from the external sources are all displayed.

Display for the navigation in this embodiment is characterized in that the top of the CRT screen always indicates the north, and that the map image (images except for the vehicle) is scrolled while the position of the vehicle is located at the center of the CRT screen. The direction in which the vehicle is travelling is indicated by the direction of the arrow which symbolizes the vehicle. In the image memory 10, nine map screens (see FIG. 22) are entered with the present vehicle position as the center.

In FIG. 14, in step S2, the value of the reduction scale, set by the switch SW7, is read in. Next, in step S4, the current position is estimated by means of the GPS device 19, the distance sensor 21 and the direction sensor 20. In step S6, it is determined whether or not new screens must be read in the image memory 10 from the CD-ROM 25a when the display symbol of the vehicle "A" moves from the previously estimated vehicle position to the presently estimated vehicle position (when the screen is scrolled). The answer becomes YES when the vehicle position reaches the position indicated by the broken line in FIG. 22. If the answer is NO, the control goes to step S14 and the screen is scrolled such that the vehicle position is kept at the center of the screen, and the direction of the arrow "A" which symbolizes the vehicle is then updated in step S16.

If it is determined in step S6 that the new screen must be read in from the CD-ROM 25a, the control goes to step S8 and the new screen data is read in from the ROM 25a. Thereafter, in step S10, the newly read "outline data" (vector data) is converted into the dot data representing the road or the like and is written in the image memory 10. Next, in step S12, the newly read name-data and graphic data are converted into the dot image and are written in the image memory 10. Subsequently, the background image is scrolled and the vehicle position is updated in steps S14 and 16.

SCREEN CONTROL IN MODE 1

Figure 15A:
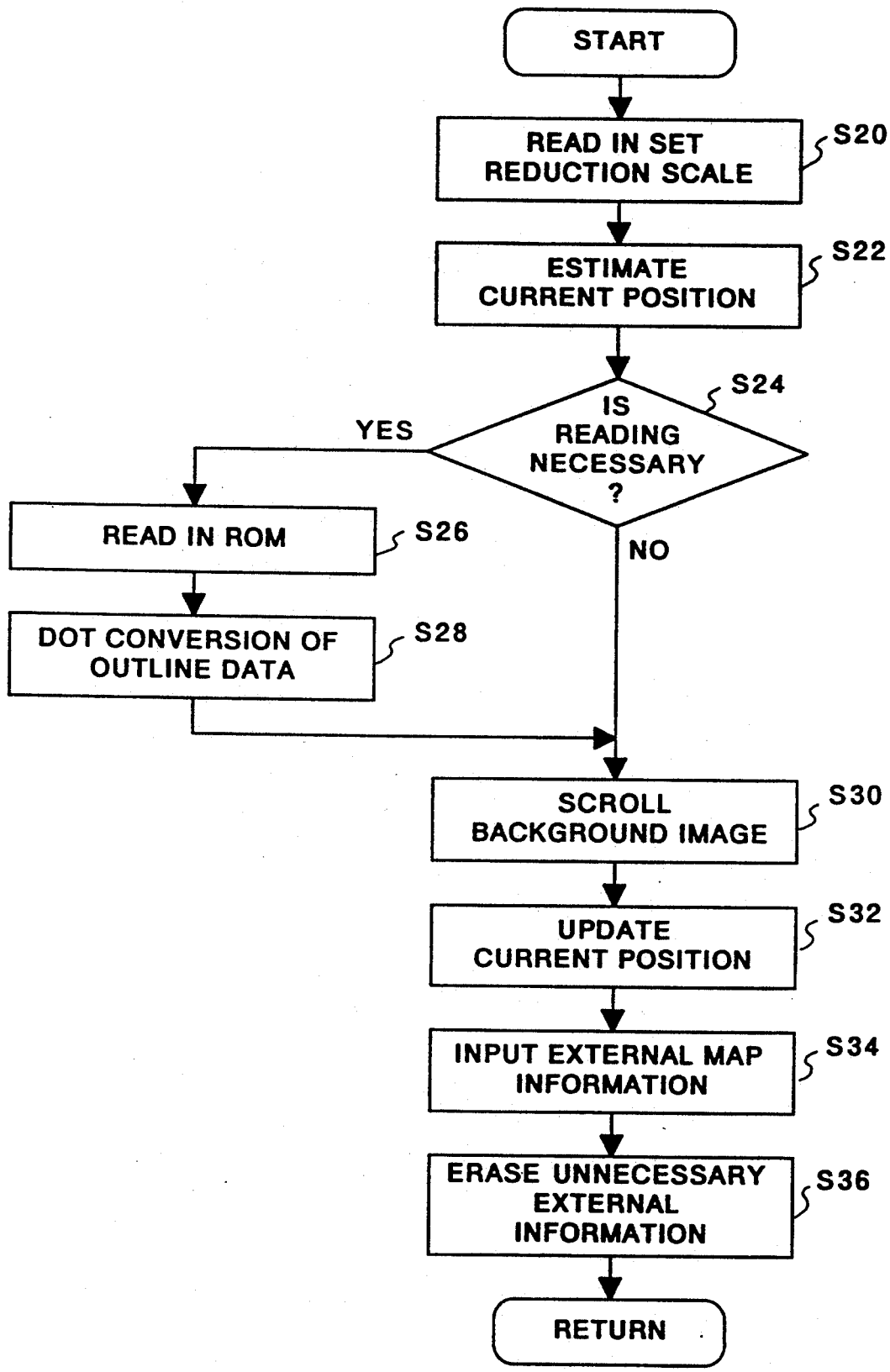
FIG. 15A is a flowchart of the control procedures for the mode 1.

FIG. 15A shows the procedures for the screen display control in the mode 1. In this control of the mode 1, all the internal map information and external map information that can be displayed are displayed on the screen while the vehicle is far from the intersection, whereas display shown in FIG. 5B is conducted while the vehicle is within 300 m from the intersection. More specifically, in step S20, the value of the reduction scale for the map set by the switch SW7 is read in. Next, in step S22, the current position is estimated using the GPS device 19, the distance sensor 21 and the direction sensor 20. In step S24, it is determined whether or not new screens must be read into the image memory 10 from the CD-ROM 25a when the display symbol of the vehicle "A" moves from the previously estimated vehicle position to the presently estimated vehicle position (when the screen is scrolled). If the answer is NO, the process goes to step S30 and the screen is scrolled so that the vehicle position is kept at the center of the screen, and the direction of the arrow "A" which symbolizes the vehicle is then updated in step S32. If it is determined in step S24 that the new screen must be read in from the CD-ROM 25a, the process goes to step S26 and the new screen data is read in from the ROM 25a. Thereafter, in step S28, the newly read "outline data" (vector data) is converted into the dot image representing the road or the like and is written in the image memory 10. Subsequently, the background image is scrolled and the vehicle position is updated in steps S30 and 32. Next, in step S34, the external map information is input from the receiver 24. In step S36, the information in the previously received external map information which has become unnecessary as a consequence of the travel of the vehicle is erased from the RAM 8. Thus, in the control up to step S36, the newest outline data representing the roads, bridges and/or buildings are written in the image memory 10, and the CRT 26 is set such that the newest vehicle position is displayed at the center of the screen. Also, the newest external map information is obtained.

Next, it is determined in step S38 whether or not the vehicle is within 300 m from a certain intersection. If the vehicle is not within 300 m, the name-data, graphic data (FIG. 4A) and the external map information are written in the image memory 10 in step S40 to display all the internal and external map information that can be displayed. Next, in step S42, the area corresponding to one screen with the vehicle position as the center is set in the CRT 26 as the area to be displayed, i.e., that area is displayed on the CRT 26. Thus, all the internal and external map information that can be displayed are displayed on the CRT 26 while the vehicle is far from the intersection.

If it is determined in step S38 that the present vehicle position is near the intersection, an area corresponding to the display screen shown in FIG. 5B is written in the image memory 10 in step S44. Thereafter, in step S46, the intersection information shown in FIG. 12F is read in. In step S48, the remaining distance "L" from the current position to the destination is calculated. In step S50, the information on the approaching intersection is searched for from among the read intersection information. In step S52, the remaining distance "L" and a predetermined constant are compared with each other. If $0 \text{ km} \leq L < 3 \text{ km}$, it is determined that the vehicle is near the destination. If $3 \text{ km} \leq L < 10 \text{ km}$, it is determined that the vehicle is far from the destination. If $L \geq 10 \text{ km}$, it is determined that the destination is very far. Thereafter, in the intersection information searched for in step S50, the intersection information corresponding to the determination made in step S52 is selectively displayed. That is, if $0 \text{ km} \leq L \leq 3 \text{ km}$, only near locations by less than 3 km are displayed (in step S54). If $3 \text{ km} \leq L \leq 10 \text{ km}$, only the locations separated by a distance from 3 km to less than 10 km are displayed (in step S56). If $L \geq 10 \text{ km}$, only the locations separated by 10 km or more are displayed (in step S58). Thereafter, in step 60, the area set in step S44 is displayed on the CRT 26. In this mode 1, as only the locations corresponding to the distance to the destination are displayed on the CRT screen, the really necessary information alone is displayed, and visibility is thus improved.

In the display control of the mode 1, all the location information, such as that shown in FIG. 5A, is displayed on the CRT 26 by pressing the switch 4a (FIG. 13).

SCREEN CONTROL IN MODE 2

The screen control procedures in the mode 2 will be described with reference to FIG. 16. In the mode 2, only the road information on roads adjacent to the route to the destination is displayed.

Figure 15B:
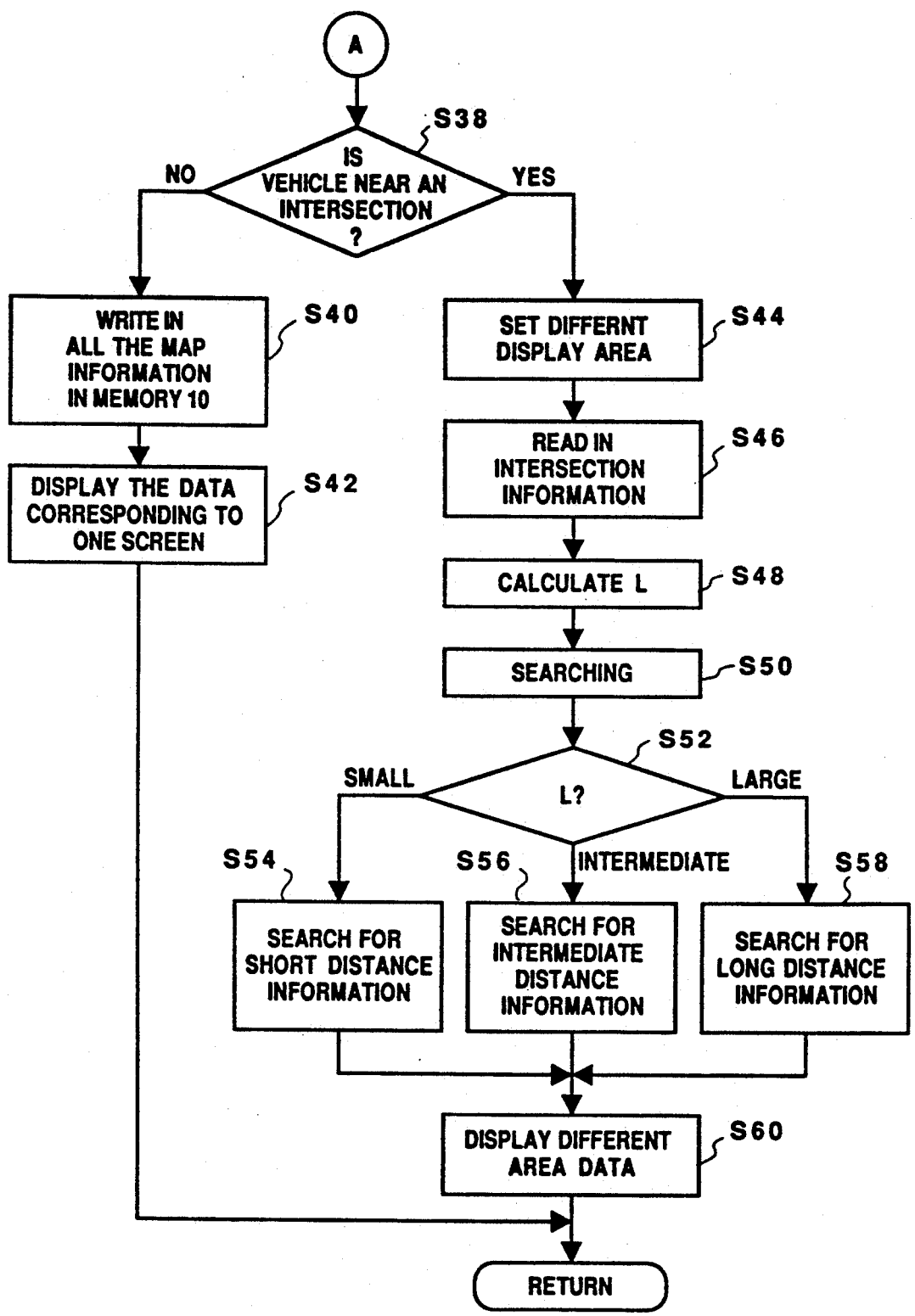
FIG. 15B is a flowchart of the control procedure when the vehicle is within 300 meters of an intersection.
Figure 16:
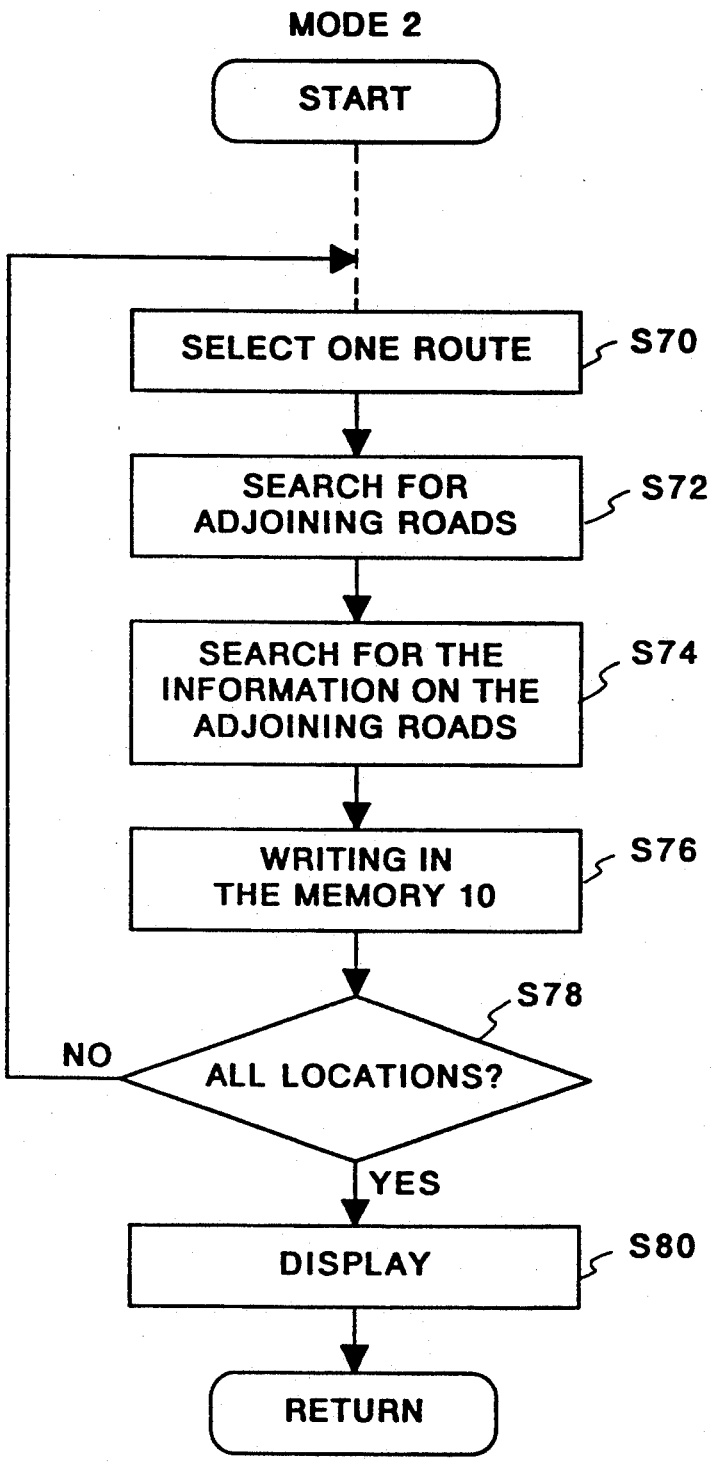
FIG. 16 is a flowchart of the control procedures for the mode 2.

The control procedures preceding step S70 in FIG. 16 are the same as those from steps S28 to S36 in FIG. 15. Thus, in steps S28 to S36, the newest outlines representing roads, bridges or buildings are written in the image memory 10, and the CRT 26 is set such that the newest vehicle position can be displayed at the center of the screen. Also, the newest external map information is obtained. Next, in step S70 in FIG. 16, the first route data shown in FIG. 12E is read in. In step S72, roads located adjacent to this first route (namely, located in the vicinity of or crosses the first route) are searched for from the road information shown in FIG. 4B. Next, in step S74, from the searched internal map information on the searched adjoining roads (e.g., the information on one-way traffic or as to whether or not the road is closed for traffic, or the parking lot information) and external map information (e.g., whether or not the road is congested or whether the parking lot has a parking space or full), that on the adjacent roads located within a predetermined distance is searched for, and the searched data is written in the image memory 10 on top of the outline data in step S76. Processing from steps S70 to S76 are conducted on all the places shown in FIG. 12E. Finally, in step S80, the data is displayed on the CRT 26.

Thus, in the mode 2, only the road information on the vicinity of the route the vehicle is going to take is displayed on the screen. Particularly, since the route is estimated by the system in the mode 2, the possibility that the driver passes the road other than the estimated one is high. Hence, display of the road information on the adjoining roads is necessary.

SCREEN CONTROL IN MODE 3

The mode 3 control will be described in connection to FIG. 7B. In the mode 3, only the road information on the designated roads along which the driver is going to pass is displayed.

Figure 17:
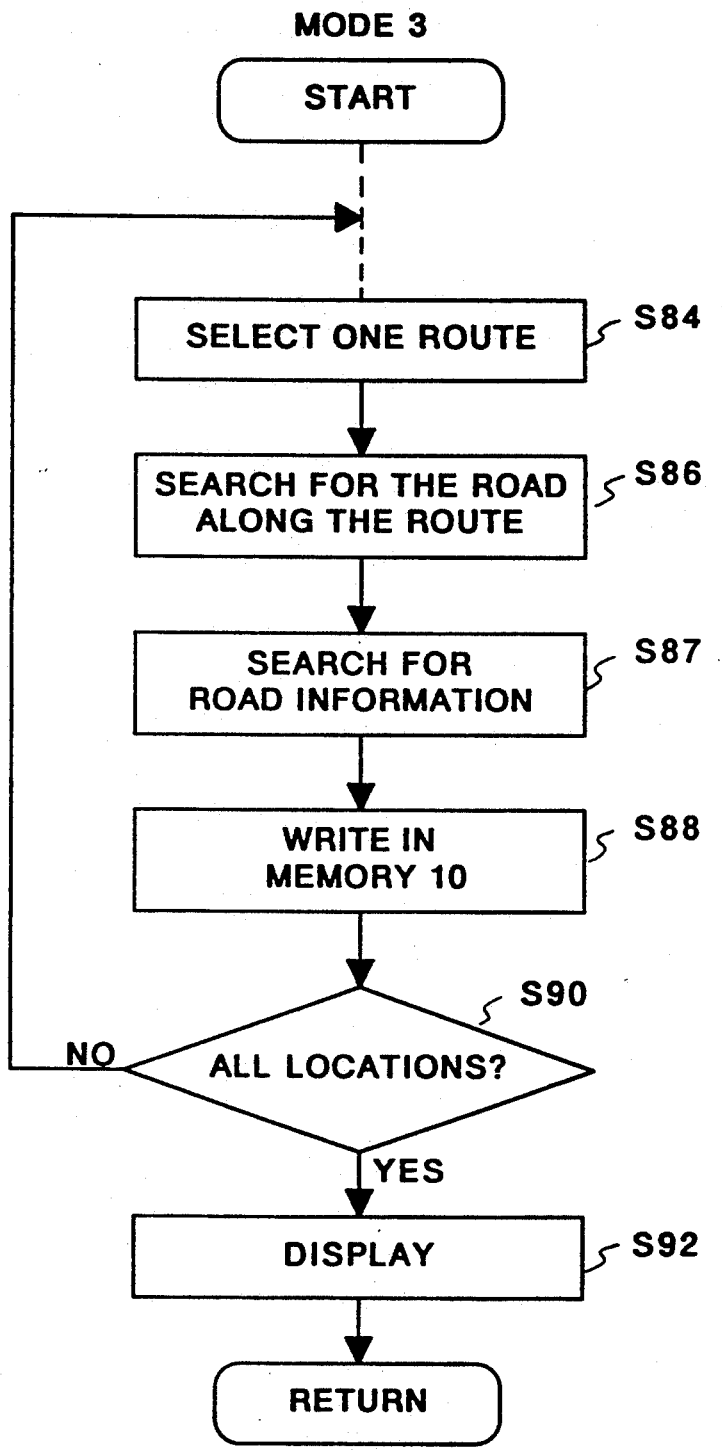
FIG. 17 is a flowchart of the control procedures for the mode 3.

The control procedures preceding step S84 in FIG. 17 are the same as those of steps S28 to S36 in FIG. 15. In step S84 in FIG. 17, the first route data shown in FIG. 12E is read in. In step S86, the roads en route are searched for from the road information shown in FIG. 4B. In step S87, the internal and external map information on the searched road is searched for, and in step S88, the searched data is then written in the image memory 10 together with the outline data. Processing from steps S84 to S88 is conducted on all the routes within the data shown in FIG. 12E. Finally, in step S92, the obtained data is displayed on the CRT 26.

In the mode 3, since the data shown in FIG. 12E is on the roads designated by the driver, the possibility that the driver passes along the road other than that road is low. Therefore, display of the road information on the designated road is sufficient, and visibility is hence improved.

SCREEN CONTROL IN MODE 4

Referring to FIG. 18, in this mode 4, only the road information on roads located adjacent to intersections designated by the driver is displayed. To achieve this, the first intersection data shown in FIG. 12F is read in step S100. Next, in step S102, roads which pass this read intersection are searched for from among the information shown in FIG. 12A. In step S104, in the internal and external map information on the searched roads, map information on roads located within the predetermined distance is searched for, and in step S106, the searched data is written in the image memory 10 over the outline data. Process from steps S100 to S106 is conducted on all the intersections shown in FIG. 12F. Thereafter, the obtained data is displayed on the CRT 26 in step S110.

In the display control of the mode 4, only the road information on the roads located adjacent to the intersections designated by the driver is displayed, and that road information will be changed with time elapsed.

SCREEN CONTROL IN MODE 5

Figure 19:
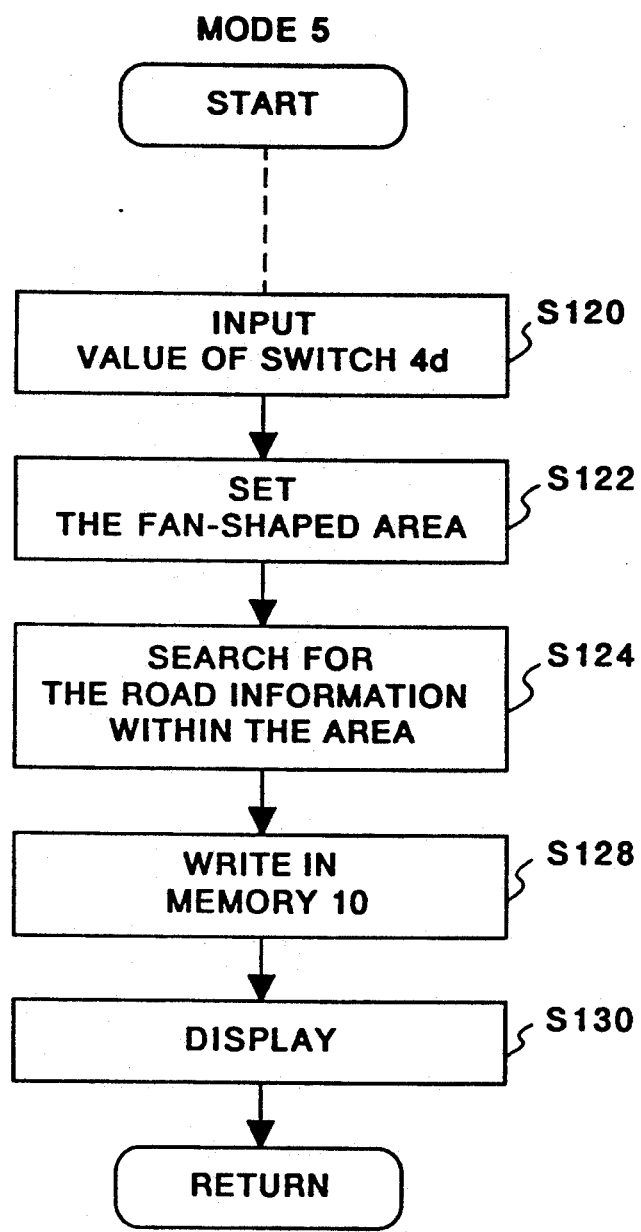
FIG. 19 is a flowchart of the control procedures for the mode 5.
Figure 20:
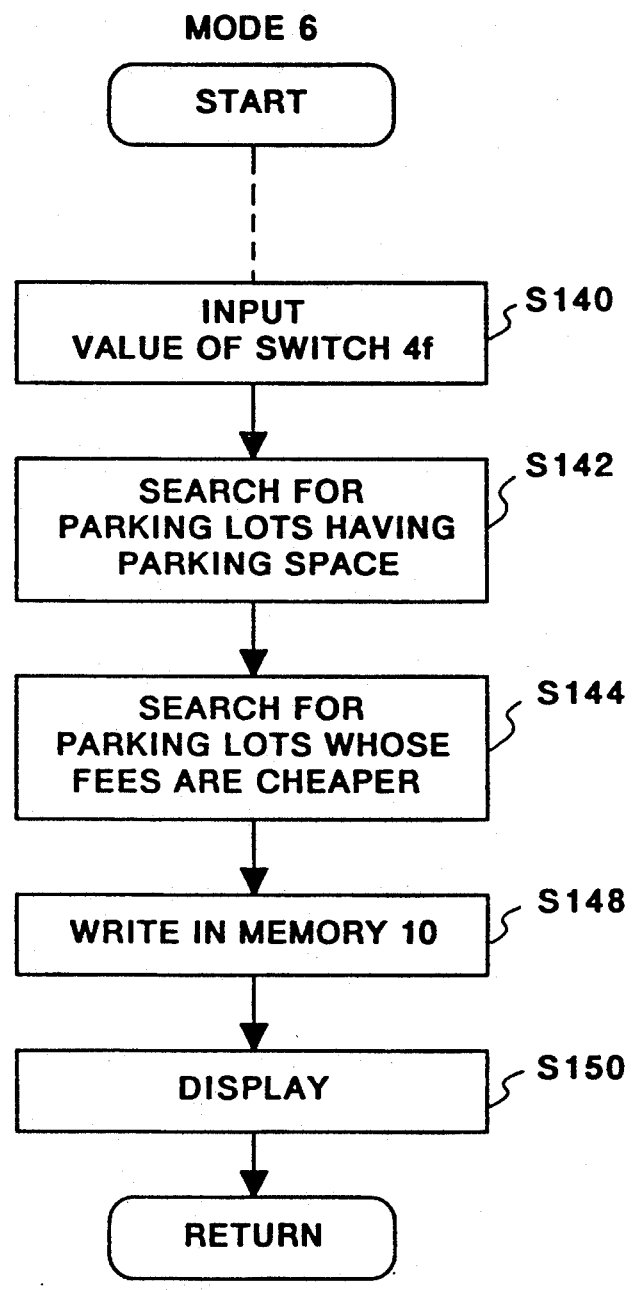
FIG. 20 is a flowchart of the control procedures for the mode 6.

In the screen control of the mode 5 shown in FIG. 19, only the road information on a predetermined area located in the travelling direction of the vehicle is displayed.

To achieve this, a value set by the switch 4d is read in step S120 in FIG. 19. In step S122, a fan-shaped area (FIG. 9) is set by the angle set by the switch 4d. Next, in step S124, the internal and external map information on this area is searched for. In step S128, the data searched in step S126 is converted into characters or symbols and written in the image memory 10. In step S130, the contents of the image memory 10 are displayed.

In the display control of the mode 5, only the road information on the roads located within the fan-shaped area designated by the driver is displayed, and furthermore that

SCREEN CONTROL IN MODE 6

Figure 10A:
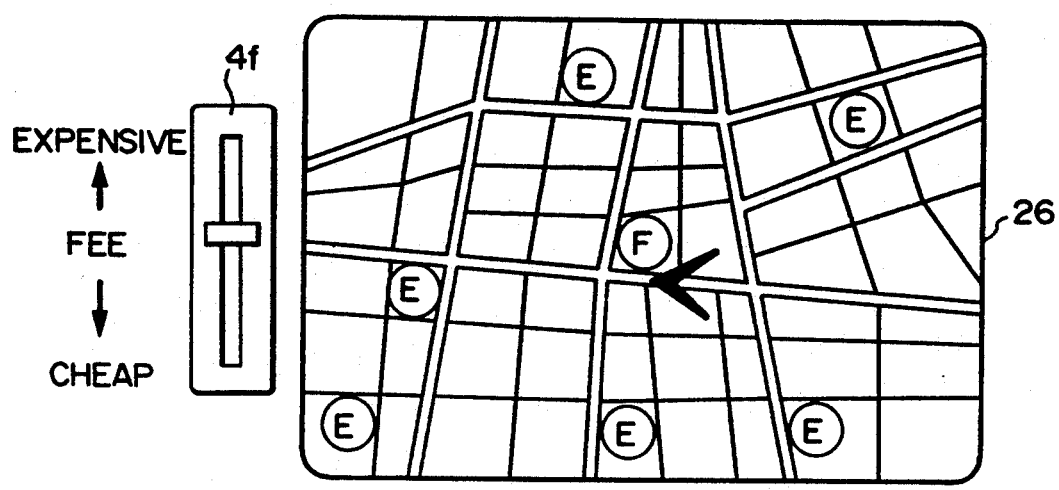
FIGS. 10A and 10B explain the display conducted when there is display control of the mode 6.
Figure 10B:
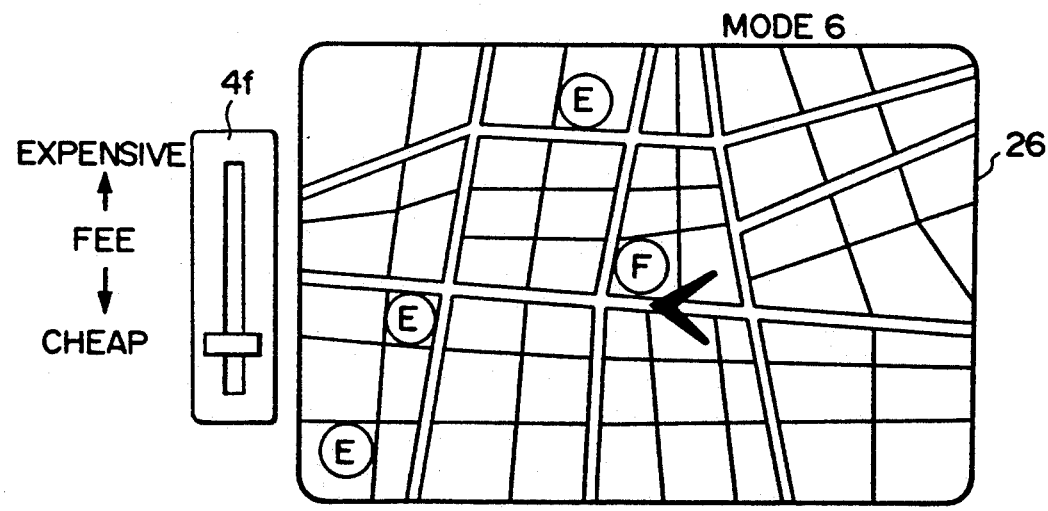

In the display control of the mode 6, only the parking lots whose parking fee meets the driver's desire and which have parking spaces, as shown in FIGS. 10A and 10B) are displayed.

To achieve this, the value set by the switch 4f is read in step S140. In step S142, parking lots having a parking space are searched for from among the information shown in FIG. 12B using the parking lot information shown in FIG. 12D. In step S144, parking lots whose parking fees are cheaper than that input by means of the switch 4f are searched for from among the parking lots searched in step S142. In step S148, the searched data is converted into characters or symbols and written in the image memory 10. In step S150, the contents of the image memory 10 are displayed.

SCREEN CONTROL IN THE MODE 7

In the screen control of this mode, the roads which are jammed with cars are obtained as the external map information (traffic information), and only the locations of the traffic jams having a length longer than that set by the switch 4e are displayed.

To achieve this, in step S160 in FIG. 21, the value set by the switch 4e is read in. In step 162, the locations of the traffic jams having a length longer than that set by the switch 4e are searched for from among the traffic jam information shown in FIG. 12C. In step S164, the symbol corresponding to the length of the jam is set to each of the traffic jams. In step S166, these symbols are written in the image memory 10. In step S168, the contents of the image memory are displayed.

The switch 4e is used to designate the length of traffic jam. However, it may be used to designate the speeds at which vehicles run on a road which is jammed with cars.

The present invention is not limited to the above embodiments and various changes and modifications can be made within the spirit and scope of the present invention. Therefore, to apprise the public of the scope of the present invention, the following claims are made.

What is claimed is:

1. A navigation system having display means for displaying road map information, comprising:
   current position estimation means for estimating an actual position of the vehicle on a displayed map;
   designating means operated by a drive for designating a destination;
   storage means for previously storing a large amount of road map information which consists of image data to be displayed and logical data on which logical determination can be made by determination means, said road map information being static;
   reading means for searching for road map information related to roads between the estimated current position of the vehicle and the designated destination location, and for reading out that information from said storage means;
   determination means for determining the relation degree of the read out road map information to at least one of the estimated actual position and the designated destination on the basis of the individual logical data contained in the read out road map information; and
   display control means for restricting display of the road map information which is determined as less related to the destination.

2. A navigation system having display means for displaying road map information, comprising:
   current position estimation means for estimating an actual position of the vehicle on a displayed map;
   designating means operated by a driver for designating a destination;
   route determination means for determining road routes along which the vehicle will travel to get to the destination from the estimated actual position;
   storage means for previously storing a large amount of road map information which comprises image data to be displayed and logical data on which a logical determination can be made, said road map information being static;
   reading means for selectively searching for road map information closely related to the routes determined by the route determination means on the basis of the logical data and for reading to only that information from said storage means; and
   display control means coupled to said reading means for displaying the selectively read out road map information whereby only information closely related to the routes determined by the route determination means is displayed.

3. The navigation system according to claim 2, wherein said road map information stored in said storage means as the logical data can be whether or not a road is one-way.

4. The navigation system according to claim 2, further comprising means for determining a shortest route to the destination.

5. The navigation system according to claim 1, wherein the road map information includes outline image data representing outline landmarks, and name/graphic image data representing a name, a symbol or a mark of the landmarks, said outline image data being always displayed; and
   wherein said display control means restricts display of name/graphic image data of the read out road map information which is determined as a less related relation degree by the determination means.

6. The system according to claim 1, further comprising distance detection means for detecting the distance the vehicle is from the destination, wherein said display control means controls the amount of displayed information on the display means so that when the vehicle is far from the destination, the road map information on locations which are close to the current vehicle position is restricted.

7. The system according to claim 6, wherein all logical data includes type information of road map information and distance information, wherein, when said detection means detects that the vehicle is approaching an intersection on the basis of type information included in the read out road map information, and determines that the vehicle is far from the destination on the basis of distance information included in the read out road map information, said display control means restricts the display of rod map information concerning locations close to the intersection.

8. The system according to claim 7, wherein the distanced information displayed can be short distance information, intermediate distance information and long distance information as determined by the display control means.

9. A navigation system having display means for displaying road map information and traffic information which is externally received from outside, said display made in overlapped manner of the road and traffic information, said system comprising:

- reception means for receiving traffic information from outside of the vehicle, said traffic information including characteristic data representing a characteristic of said traffic information and type data representing a type of the traffic information;
- current position estimation means for estimating an actual position of the vehicle;
- designating means operated by a driver for alterably designating a characteristic range for at least one type of data outside which range the driver wants to mask received traffic information;
- storage means for previously storing a large amount of road map information including map image data to be displayed, and graphic images corresponding to types of traffic information;
- reading means for reading road map information on roads in the vicinity of the estimated actual position; and
- masking means for determining whether the received characteristic data is within the designated characteristic range for the type of data received and restricting display of the read out graphic images of the received traffic information such that data outside of the designated characteristic range for the type of data received is not displayed.

10. The navigation system according to claim 9 wherein said traffic information comprises information as to how much of the roads on which the vehicle may travel are congested with cars and wherein the drive alters a length standard of congestion using the designating means to generate a designated length standard, and wherein said masking means restricts the display of traffic congestion information such that received congestion information received as traffic information is masked when the congestion information indicates that the length of the traffic congestion is shorter than the designated length standard.

11. The navigation system according to claim 9, wherein said traffic information comprises an occupation rate of parking lots and the driver alters occupation rate standard using said designating means so that the received traffic information informing of parking lots, the occupation rates of which are larger than the designated rate standard are masked.

12. The system according to claim 9, wherein said designating means further comprises means operated by the driver for altering the range.

13. The system according to claim 9, further comprising means for estimating a traveling direction of the vehicle, wherein said designating means designates a sector shaped area in the direction of the estimated direction ahead of the estimated current vehicle position, wherein the driver alters the opening angle of the sector shaped area using said designating means.

14. The navigation system according to claim 9, wherein said traffic information comprises an occupation rate of parking lots and wherein the driver alters parking fee standard using the designating means so that the received traffic information informing of parking lots, the fee of which are more expensive than the designated fee standard are masked.

15. The navigation system according to claim 9, wherein said traffic information comprises information as to how much of the roads on which the vehicle may travel are congested with cars and wherein the driver alters a length standard of congestion using the designating means to generate a designated length standard, and wherein said masking means restricts the display of traffic information congestion information such that received congestion information received as traffic information is masked when the congestion information indicates that the length of the traffic congestion is longer than the desired length standard.

* * * * *

UNITED STATES PATENT AND TRADEMARK OFFICE
CERTIFICATE OF CORRECTION

PATENT NO. : 5,293,163
DATED : March 8, 1994
INVENTOR(S) : Kakihara et al.

It is certified that error appears in the above-indentified patent and that said Letters Patent is hereby corrected as shown below:

Column 2, line 54;
  After "vehicle" insert --;--.

Column 6, line 67;
  After "a" insert --plurality of arrows indicate that they are congested--.

Column 12, line 68;
  After "that" insert --road information will be changed with time.--.

Column 13, Claim 1, line 48;
  "drive" should be --driver--.

Column 14, Claim 2, line 18;
  "to" should be --out--.

Column 14, Claim 7, line 59;
  "rod" should be --road--.

Column 15, Claim 10, line 33;
  "drive" should be --driver--.

Signed and Sealed this

Thirteenth Day of December, 1994

Attest:

BRUCE LEHMAN

*Attesting Officer*  *Commissioner of Patents and Trademarks*